(12) United States Patent
Yang et al.

(10) Patent No.: US 8,262,537 B2
(45) Date of Patent: Sep. 11, 2012

(54) METHOD FOR TRANSITIONING CONTROL IN A MULTI-MODE HYBRID TRANSMISSION

(75) Inventors: Hong Yang, Rochester Hill, MI (US); Shawn H Swales, Canton, MI (US); Joel M. MaGuire, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 518 days.

(21) Appl. No.: 12/501,603

(22) Filed: Jul. 13, 2009

(65) Prior Publication Data

US 2011/0009236 A1    Jan. 13, 2011

(51) Int. Cl.
*B60W 10/02* (2006.01)
(52) U.S. Cl. ............................................... 477/5
(58) Field of Classification Search ............ 477/3, 4, 477/5; 475/5
See application file for complete search history.

(56) References Cited

U.S. PATENT DOCUMENTS

| | | | |
|---|---|---|---|
| 6,702,709 B2 * | 3/2004 | Bowen | 475/277 |
| 7,464,801 B2 | 12/2008 | Wittkopp | |
| 7,766,790 B2 * | 8/2010 | Stevenson et al. | 477/8 |
| 2007/0225097 A1 * | 9/2007 | Raghavan et al. | 475/5 |
| 2008/0169165 A1 | 7/2008 | Samie et al. | |
| 2009/0036246 A1 * | 2/2009 | Bucknor et al. | 475/5 |
| 2009/0082171 A1 * | 3/2009 | Conlon et al. | 477/5 |
| 2009/0084653 A1 * | 4/2009 | Holmes | 192/41 A |
| 2009/0176610 A1 * | 7/2009 | Conlon | 475/5 |
| 2009/0194381 A1 * | 8/2009 | Samie et al. | 192/43.2 |
| 2011/0015021 A1 * | 1/2011 | Maguire et al. | 475/8 |

* cited by examiner

*Primary Examiner* — Roger Pang

(57) ABSTRACT

A multi-mode hybrid transmission including a selectable one-way clutch and first and second torque machines transitions to operating in a target continuously variable mode including applying a selectable one-way clutch and controlling input torque and motor torques of the first and second torque machines using a second kinematic relationship. A multi-step process is executed to transition the first clutch to a deactivated state, transition the second selectable one-way clutch to the applied state, and transition to using the second kinematic relationship to achieve a preferred output torque.

17 Claims, 6 Drawing Sheets

METHOD FOR TRANSITIONING CONTROL IN A MULTI-MODE HYBRID TRANSMISSION

TECHNICAL FIELD

This disclosure is related to controlling multi-mode hybrid transmission systems.

BACKGROUND

The statements in this section merely provide background information related to the present disclosure and may not constitute prior art.

Known powertrain architectures include torque-generative devices, including internal combustion engines and torque machines that transfer torque through a transmission device to an output member. One exemplary powertrain includes a multi-mode hybrid transmission having an input member that receives tractive torque from a prime mover power source and torque machines and transfers torque to an output member. The output member can be operatively connected to a driveline for a motor vehicle for transferring tractive torque thereto. The torque machines can include electric machines that operate as motors or generators and generate torque inputs to the transmission independently of a torque input from the internal combustion engine. The torque machines may transform vehicle kinetic energy transferred through the vehicle driveline to potential energy that is storable in an energy storage device through a process referred to as regenerative braking. A control system monitors various inputs from the vehicle and the operator and provides operational control of the powertrain, including controlling transmission operating state and gear shifting, controlling the torque-generative devices, and regulating the power interchange among the energy storage device and the torque machines to manage outputs of the transmission, including torque and rotational speed. Known multi-mode hybrid transmissions can use differential gearing, torque transfer clutches, and the torque machines to transfer power to an output member that can be connected to a driveline when the powertrain is applied to a vehicle.

Known transmission devices have spin losses that affect energy efficiency of the transmission and thus affect fuel economy. Transmission spin losses can be caused by friction between contiguous non-applied friction clutch plates.

Selectable one-way clutch devices (SOWCs) can be used in some transmissions to reduce spin losses. Known selectable one-way clutch devices (SOWCs) can transfer torque between contiguous coaxial rotating devices when applied. Each of the contiguous rotating devices has a race. One race is oriented radially concentric to and opposing the race of the other rotating device, or the two races are opposite each other axially. A multiplicity of controllable torque transferring devices, e.g., rollers, sprags, rockers or struts, are connected to one of the races and positioned to oppose the other race. The opposed race includes a multiplicity of surface receiving features corresponding to the controllable torque transferring devices. Known selectable one-way clutch devices are applied by controlling the controllable torque transferring devices to interact with and connect to the surface receiving features to lock rotations of the contiguous rotating devices to transfer torque therebetween. Known selectable one-way clutch devices can lock rotations of the contiguous rotating devices when rotating in a first direction. Thus, when one of the contiguous rotating devices rotates in the first direction, torque is transferred to the other contiguous rotating device. When the contiguous rotating device rotates in a second direction opposite to the first direction, no torque is transferred, permitting the rotating device to freewheel. In one embodiment, a selectable one-way clutch device can include controllable torque transferring devices that can be controlled to a first position to interact with and connect to the surface receiving features to lock rotations of the contiguous rotating devices when rotating in one direction, and can also be controlled to a second position to interact with and connect to the surface receiving features to lock rotations of the contiguous rotating devices when rotating in the second direction opposite to the first direction. Known selectable one-way clutch devices can be controlled to another position to interact with and connect to the surface receiving features to lock rotations of the contiguous rotating devices when rotating in both the first direction and the second direction. Known selectable one-way clutch devices can be controlled to another position to unlock rotation of the contiguous rotating devices when rotating in both the first direction and the second direction. Known selectable one-way clutch devices require substantially synchronous rotation of the contiguous rotating devices prior to applying the controllable torque transferring devices.

SUMMARY

A multi-mode hybrid transmission is configured to transfer power between an input member and an output member and first and second torque machines in one of two continuously variable modes by selectively applying two selectable one-way clutches. A method for operating the multi-mode hybrid transmission includes operating the hybrid transmission in an initial continuously variable mode including applying the first selectable one-way clutch and controlling an input torque at the input member and motor torques of the first and second torque machines using a first kinematic relationship to achieve a preferred output torque. The hybrid transmission is commanded to transition to operating in a target continuously variable mode including applying the second selectable one-way clutch and controlling the input torque at the input member and motor torques of the first and second torque machines using a second kinematic relationship to achieve the preferred output torque. A multi-step process is executed transitioning the first selectable one-way clutch to a deactivated state, transitioning the second selectable one-way clutch to the applied state, and transitioning controlling the input torque at the input member and the motor torques of the first and second torque machines using the first kinematic relationship to using the second kinematic relationship to achieve the preferred output torque when rotational speeds of the first and second torque machines are substantially a synchronous speed.

BRIEF DESCRIPTION OF THE DRAWINGS

One or more embodiments will now be described, by way of example, with reference to the accompanying drawings, in which.

DETAILED DESCRIPTION

Figure 1:
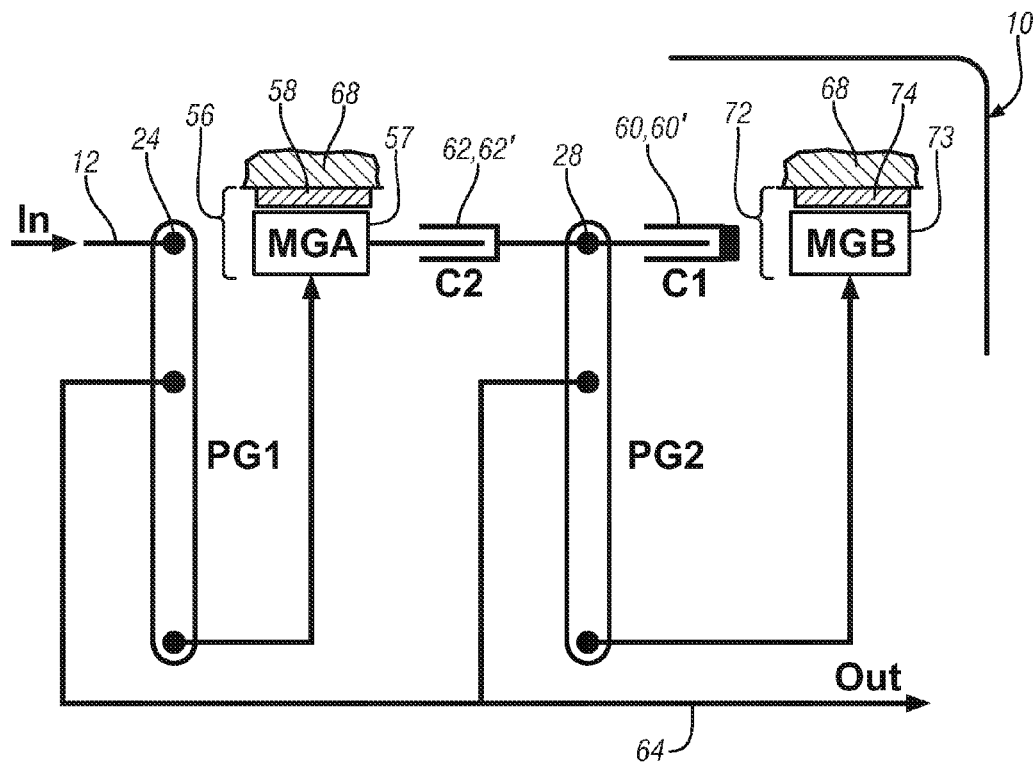
FIG. 1 is a schematic diagram of an embodiment of an exemplary transmission, in accordance with the present disclosure.

Referring now to the drawings, wherein the showings are for the purpose of illustrating certain exemplary embodiments only and not for the purpose of limiting the same, FIG. 1 schematically depicts a multi-mode hybrid transmission 10 including a two-mode hybrid transmission in accordance with the present disclosure. It is appreciated that the concepts described herein can be applied to other multi-mode hybrid transmissions having controllable torque machines configured to control motor torques and rotational speeds of elements of torque transfer clutch devices, including, e.g., two-mode, three-mode and four-mode hybrid transmission systems. It is appreciated that the torque machines can be electric machines, hydraulic machines, and other machines configured to convert stored energy to mechanical power and torque. By way of definition, the term 'mode' is used to describe operation of a hybrid transmission wherein rotational speed of a transmission output member is determined based upon a relationship between a rotational speed of an input member and rotational speeds of one or more torque machines mechanically coupled thereto, and is not a fixed ratio of the rotational speed of the transmission input member. A multi-mode transmission includes multiple operating states and corresponding power relationships wherein the transmission output power is determined based upon one of the relationships between rotational speed of the input member and rotational speeds of the torque machines.

The exemplary two-mode hybrid transmission 10 includes first and second differential gears (PG1 and PG2) 24 and 28, including planetary gears in one embodiment. There are first and second torque machines (MGA and MGB) 56 and 72, first and second clutch devices C1 60, 60' and C2 62, 62', and an input member 12 and an output member 64. In one embodiment the input member 12 is coupled to an output shaft from an internal combustion engine, and the output member 64 is coupled to a driveline. The exemplary two-mode hybrid transmission 10 is operative in one of at least two continuously variable modes to transfer mechanical power between the input member 12, the first and second torque machines 56 and 72 and the output member 64. The hybrid transmission 10 operates in a first continuously variable mode by applying the first clutch device C1 60, 60'. The hybrid transmission 10 operates a second continuously variable mode by applying the second clutch C2 62, 62'. In a first embodiment, the first and second clutch devices C1 60 and C2 62 include Type I single one-way clutch devices. In a second embodiment, the first and second clutch devices C1 60' and C2 62' include Type II single one-way clutch devices. Type I and Type II single one-way clutch devices are described hereinbelow.

The first and second torque machines 56 and 72 include three-phase AC electric motor/generator machines in one embodiment, each including a stator 58 and 74, a rotor 57 and 73, and respective position sensing systems. The motor stators 58 and 74 are grounded to an outer portion of a transmission case 68, and each includes a stator core with coiled electrical windings extending therefrom. The rotor 57 for the first torque machine 56 is preferably supported on a hub that is rotationally, operatively connected to an input node including an element of the first differential gear set 24 and is sun gear in the embodiment. The rotor 73 for the second electric machine 72 is rotationally operatively connected to an input node including an element of the second differential gear set 28 and is a sun gear in the embodiment. Alternatively, other torque machines, e.g., hydraulic-mechanical torque machines can be used. The first and second torque machines 56 and 72 are each operative to generate power over a range of nominally positive and negative rotational speeds. The first and second torque machines 56 and 72 are each operative to transform stored energy to generate a tractive torque output that can be transferred to the transmission 10, ranging from a zero torque output to a maximum tractive torque capacity. The first and second torque machines 56 and 72 are each operative to react tractive/braking torque input to the output member 64 of the hybrid transmission 10 to generate energy that can be stored in an energy storage device, ranging from zero to a maximum reactive torque capacity.

The first clutch C1 60, 60' is operative to fixedly rotationally ground an element of the second differential gear set 28, in this embodiment a ring gear element, to the transmission case 68 when the first clutch C1 60, 60' is applied. The second clutch device C2 62, 62' is operative to fixedly rotationally connect the rotor 57 of the first torque machine 56 to the ring gear element of the second differential gear set 28 when the second clutch C2 62 is applied. The first and second clutches C1 60, 60' and C2 62, 62' each preferably includes a selectable one-way clutch.

A Type I SOWC operates in one of three operating states, including a fully-open or deactivated state and applied states including a one-way state and a fully-closed or locked state. When the Type I SOWC is in the fully-open state, there is no coupling across the clutch elements and the clutch elements are free to rotate without transferring torque to the other element. When the Type I SOWC is applied in the one-way state, there is selective coupling across the clutch elements. Torque can be transferred across the clutch elements when rotating in a first direction, whereas no torque is transferred across the clutch elements when rotating in the second, opposite direction. When the Type I SOWC is applied in the fully-closed state, the clutch elements are fixedly connected and torque can be transferred across the clutch elements when rotating in either of the first direction and the second, opposite direction. A Type II SOWC operates in one of four operating states, including a fully-open or deactivated state and applied states including first and second one-way states and a fully-closed or locked state. When the Type II SOWC is in the fully-open state, there is no coupling across the clutch elements, and both clutch elements are free to rotate without transferring torque to the other element. When the Type II SOWC is applied in the first one-way state, there is selective coupling across the clutch elements to transfer torque across the clutch elements when rotating in the first direction, whereas no torque is transferred across the clutch elements when rotating in the second, opposite direction. When the Type II SOWC is applied in the second one-way state, no torque is transferred across the clutch elements when rotating in the first direction, whereas there is selective coupling across the clutch elements to transfer torque when rotating in the second, opposite direction. When the Type II SOWC is applied in the fully-closed state, the clutch elements are fixedly connected and torque is transferred across the clutch elements when rotating in either the first or the second, opposite direction.

In operation, a multi-mode hybrid transmission, e.g., the hybrid transmission 10 described with reference to FIG. 1, is configured to transfer power between an input member and an output member and first and second torque machines in one of two continuously variable modes by selectively applying clutches, at least one of which is a selectable one-way clutch. The hybrid transmission 10 is operated in an initial continuously variable mode, which includes applying the first clutch and controlling input torque and motor torques of the first and second torque machines using a first kinematic relationship to achieve a preferred output torque. The hybrid transmission 10 is commanded to transition to operating in a target continuously variable mode. Operating in the target continuously variable mode includes applying a second, selectable one-way clutch and controlling input torque and motor torques of the first and second torque machines using a second kinematic relationship to achieve the preferred output torque. A multi-step process is executed to transition the first clutch to a deactivated state, transition the second, selectable one-way clutch to the applied state, and transition from controlling the input torque and the motor torques of the first and second torque machines using the first kinematic relationship to using the second kinematic relationship to achieve the preferred output torque when rotational speeds of the first and second torque machines are substantially synchronized. This operation is now described with reference to the multi-mode hybrid transmission 10 described with reference to FIG. 1.

Torque transfer through the multi-mode hybrid transmission 10 is controlled using kinematic relationships for speed and torque transfer between the input member 12, the first and second torque machines 56 and 72, and the output member 64. The kinematic relationships are executed in a control module device as a control scheme, preferably including algorithmic code and calibrated terms. The control module executes the algorithmic code to control input torque at the input member 12 and motor torques of the first and second torque machines 56 and 72 to achieve a preferred output torque at the output member 64, and control input speed at the input member 12 and motor speeds of the first and second torque machines 56 and 72 to achieve a preferred output speed at the output member 64. The control scheme includes predetermined torque and speed relationships reduced to control algorithms that can be executed in a control module during ongoing operation to control operation of the first and second torque machines 56 and 72 based upon input power at the input member 12 and the preferred output power at the output member 64. The output power at the output member 64 is characterized in terms of an output rotational speed $N_O$ and an output torque $T_O$ that preferably correspond to and are responsive to an operator torque request.

The kinematic relationships include a first torque relationship corresponding to the first continuously variable mode as follows:

$$\begin{bmatrix} T_A \\ T_B \end{bmatrix} = \begin{bmatrix} a11 & a12 & a13 & a14 \\ a21 & a22 & a23 & a24 \end{bmatrix} \begin{bmatrix} T_I \\ T_O \\ \dot{N}_I \\ \dot{N}_O \end{bmatrix} \quad [1]$$

wherein $\dot{N}_I$ is rotational acceleration of the input member 12,
$\dot{N}_O$ is rotational acceleration of the output member 64,
$T_I$ is the input torque from the input member 12,
$T_O$ is the output torque to the output member 64,
$T_A$ is motor torque of the first torque machine 56,
$T_B$ is motor torque of the second torque machine 72, and
a11-a24 are scalar values determined for operating the hybrid transmission 10 in the first continuously variable mode.

The kinematic relationships include a second torque relationship corresponding to the second continuously variable mode as follows:

$$\begin{bmatrix} T_A \\ T_B \end{bmatrix} = \begin{bmatrix} b11 & b12 & b13 & b14 \\ b21 & b22 & b23 & b24 \end{bmatrix} \begin{bmatrix} T_I \\ T_O \\ \dot{N}_I \\ \dot{N}_O \end{bmatrix} \quad [2]$$

wherein b11-b24 are scalar values determined for operating the hybrid transmission 10 in the second continuously variable mode.

The kinematic relationships include a first speed relationship corresponding to the first continuously variable mode as follows:

$$\begin{bmatrix} N_A \\ N_B \end{bmatrix} = \begin{bmatrix} c11 & c12 \\ c21 & c22 \end{bmatrix} \begin{bmatrix} N_I \\ N_O \end{bmatrix} \quad [3]$$

wherein $N_I$ is rotational speed of the input member 12,
$N_O$ is rotational speed of the output member 64,
$N_A$ is rotational speed of the first torque machine 56,
$N_B$ is rotational speed of the second torque machine 72, and
c11-c22 are scalar values determined for operating the hybrid transmission 10 in the first continuously variable mode.

The kinematic relationships include a second speed relationship corresponding to the second continuously variable mode as follows:

$$\begin{bmatrix} N_A \\ N_B \end{bmatrix} = \begin{bmatrix} d11 & d12 \\ d21 & d22 \end{bmatrix} \begin{bmatrix} N_I \\ N_O \end{bmatrix} \quad [4]$$

wherein d11-d22 are scalar values determined for operating the hybrid transmission 10 in the second continuously variable mode.

One of the first and second kinematic relationships is selected and executed during operation in the corresponding continuously variable mode to determine the commanded motor torques output from the first and second torque machines 56 and 72 during ongoing operation.

FIGS. 2A through 2F are graphical depictions, including a plurality of lever diagrams associated with the hybrid transmission 10 of FIG. 1. The lever diagrams each depict nodes of the first and second differential gears 24 and 28, first and second torque machines (MGA and MGB), and application states for the first and second clutch devices C1 60 and C2 62 including Type I SOWC devices. Dashed lines depict gear speeds at the nodes, including input speed (In) at the input member 12 and output speed (Out) at the output member 64, each shown as relative to a zero speed line including a nominally positive speed (+) and a nominally negative speed (−). The zero speed line is a synchronous speed line, i.e., rotational speeds of the elements at the selected node are synchronized. The graphical depictions shown in FIGS. 2A through 2F include a sequentially executed, multi-step process for transitioning operation of the hybrid transmission 10 from a first, initial continuously variable mode to a second, target continuously variable mode when the first and second clutch devices C1 60 and C2 62 include Type I SOWC devices. The Type I SOWC devices C1 60 and C2 62 can operate in one of three operating states, including a fully-open state, a one-way state, and a fully-closed state, as previously described.

Figure 2A:
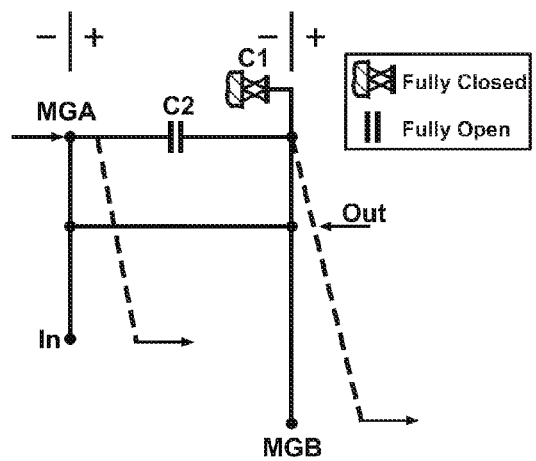
FIGS. 2A-2F and 3A-3F are schematic lever diagrams for graphically describing operation and control of the exemplary transmission, in accordance with the present disclosure.

FIG. 2A shows the transmission 10 initially operating in the first continuously variable mode. Clutch C2 62 is in the fully-open state and clutch C1 60 is in the fully-closed state. The transmission 10 is operative to generate and transfer tractive torque using only the second torque machine 72 and using both the first and second torque machines 56 and 72. The transmission 10 is operative in a coast-down state, including using the second torque machine 72 to generate reactive torque for regenerative braking. The input torque from the input member 12 and the motor torques from the first and second torque machines 56 and 72 are determined using the first kinematic relationship described with reference to Eqs. 1 and 3 in response to the operator torque request to generate the torque output to the output member 64.

Figure 2B:
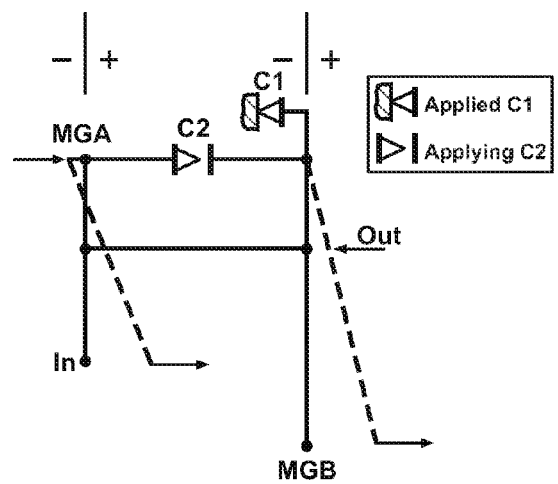

FIG. 2B shows a first step in the transition to the target continuously variable mode, i.e., the second continuously variable mode in this example. If the second torque machine 72 had been generating reactive torque for regenerative braking, it is discontinued. Clutch C1 60 is transitioned to the one-way state and clutch C2 62 is transitioned to the one-way state. The input torque from the input member 12 and the motor torques from the first and second torque machines 56 and 72 continue to be determined using the first kinematic relationship described with reference to Eqs. 1 and 3 in response to the operator torque request to generate the torque output to the output member 64. Rotational speed of the output member 64 is maintained in response to the operator torque request, and input speed of the input member 12 is controlled to maintain the speed of the first torque machine 56 rotating at a nominally negative speed, and steadily approaching zero, i.e., a synchronous speed. Clutch C1 60 transfers the reactive torque to maintain the requested output torque, while clutch C2 62 does not transfer torque in the one-way state and the speed of the first torque machine is nominally negative. Regenerative braking is not available in this step.

Figure 2C:
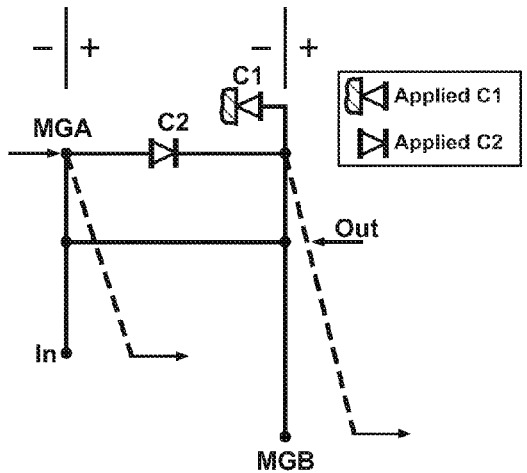

FIG. 2C shows a second step in the transition to the target continuously variable mode. Clutch C1 60 transitions from transferring full load to transferring zero load and clutch C2 62 transitions from transferring zero load to transferring full load as the speed of the first torque machine 56 is substantially near to and reaches zero RPM, i.e., the synchronous speed. The speed of the first torque machine 56 is substantially near to zero RPM when it is less than about 10 RPM in one embodiment. The input torque from the input member 12 and the motor torques from the first and second torque machines 56 and 72 transition from being determined using the first kinematic relationship described with reference to Eqs. 1 and 3 to being determined using the second kinematic relationship described with reference to Eqs. 2 and 4, including responding to the operator torque request to generate the torque output to the output member 64. Regenerative braking is not available in this state.

Figure 2D:
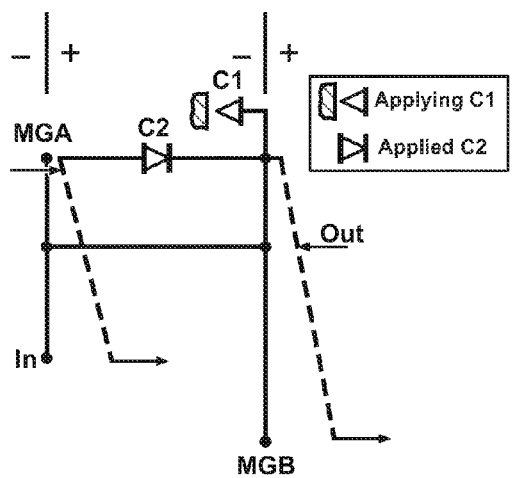

FIG. 2D shows a third step in the transition to the target continuously variable mode. Clutch C1 60 transitions completely to transfer zero torque and clutch C2 62 transitions to transfer full torque as the speed of the first torque machine 56 increases in a positive direction greater than zero. The first torque machine 56 increases torque output. The input torque from the input member 12 and the motor torques from the first and second torque machines 56 and 72 are determined using the second kinematic relationship described with reference to Eqs. 2 and 4 in response to the operator torque request to generate the torque output to the output member 64 when the speed of the first torque machine 56 increases past zero, i.e., spins in a nominally positive direction. Regenerative braking is not available in this step.

Figure 2E:
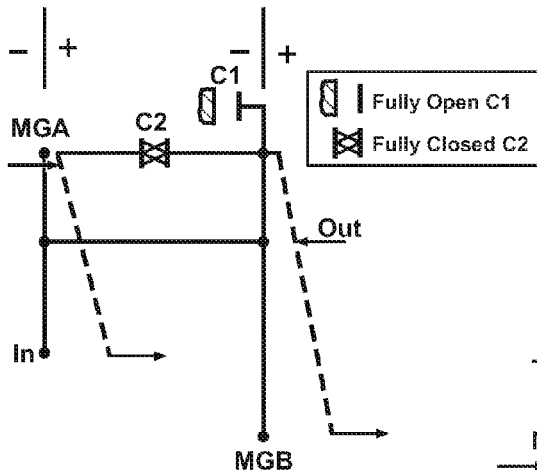

FIG. 2E shows a fourth step in the transition to the target continuously variable mode. Clutch C1 60 transitions to the fully-open state. Clutch C2 62 transitions to the fully-closed state. The input torque from the input member 12 and the motor torques from the first and second torque machines 56 and 72 are determined using the second kinematic relationship described with reference to Eqs. 2 and 4 in response to the operator torque request to generate the torque output to the output member 64. The second torque machine 72 can be used for generating tractive torque and for generating reactive torque for regenerative braking. The speed of the first torque machine 56 is preferably positive and low, around 10 RPM in one embodiment.

Figure 2F:
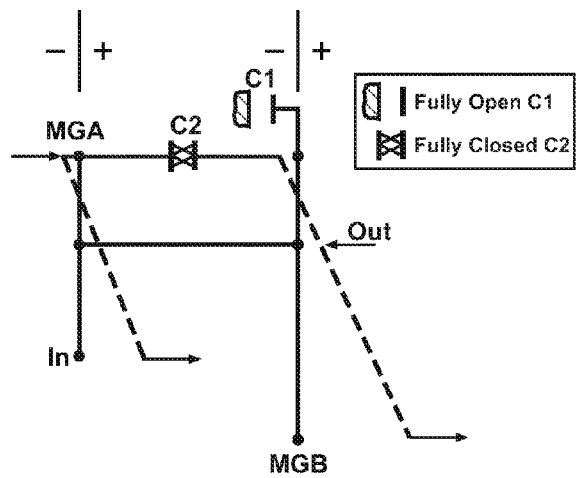

FIG. 2F shows operation in the target continuously variable mode. Clutch C1 60 is in the fully-open state. Clutch C2 62 is in the fully-closed state. The input torque from the input member 12 and the motor torques from the first and second torque machines 56 and 72 are determined using the second kinematic relationship described with reference to Eqs. 2 and 4 in response to the operator torque request to generate the torque output to the output member 64. The first and second torque machines 56 and 72 can be used for generating tractive torque and for generating reactive torque for regenerative braking.

Some amount of active damping using the first and second torque machines 56 and 72 may be needed when there is a noticeable amount of mid-to high-frequency road load disturbance, in order to keep torque applied across clutch C2 62 without generating noise or vibration from clutch C2 62 when operating in the one-way state.

The mode transitions of clutch C1 60 from the one-way state to the fully-open state and clutch C2 62 from the one-way state to the fully-closed state can happen at an off-synchronous speed, i.e., when the speed of the first torque machine 56 is a small nominally positive value. This permits operation in one of a torque-generating mode and a coast-down mode in the second continuously variable operating mode and waiting for a stable output speed to change, with the first torque machine rotating at a nominally positive speed with positive torque. During the clutch mode changing event, when there is a need to offload torque from one of the clutches (depending upon the specific clutch mode switch mechanism) through modifying one or both of the motor torque and the engine torque, the system can wait to effect a transition until in a coasting state or a braking state without regenerative braking, in order to minimize the impact on output torque at the output member 64.

This operation can be used to effect a transition from the first continuously variable mode to the second continuously variable mode. The operation described can also be used to effect a transition from the second continuously variable mode to the first continuously variable mode by executing the aforementioned steps in reverse order.

FIGS. 3A through 3F are graphical depictions, including a plurality of lever diagrams associated with the hybrid transmission 10 of FIG. 1. The lever diagrams each depict nodes of the first and second differential gears 24 and 28, first and second torque machines (MGA and MGB), and application states for the first and second clutch devices C1 60' and C2 62' including Type TI SOWC devices. Dashed lines depict gear speeds at the nodes, including input speed (In) at the input member 12 and output speed (Out) at the output member 64, each shown as relative to a zero speed line. The graphical depictions shown in FIGS. 3A through 3F include a sequentially executed multi-step process for transitioning operation of the hybrid transmission 10 from a first, initial continuously variable mode to a second, target continuously variable mode. The Type II SOWC devices 60' and 62' can operate in one of four operating states, including a fully-open state, first and second one-way states, and a fully-closed state. The transition operation described herein using the Type II SOWC devices permits the hybrid transmission 10 to transfer reactive torque from one of the first and second torque machines 56 and 72 to operate in the regenerative braking mode during a transition between the first and second continuously variable modes. As previously discussed, regenerative braking during the transition between the first and second continuously variable mode is not possible using Type I SOWC devices.

Figure 3A:
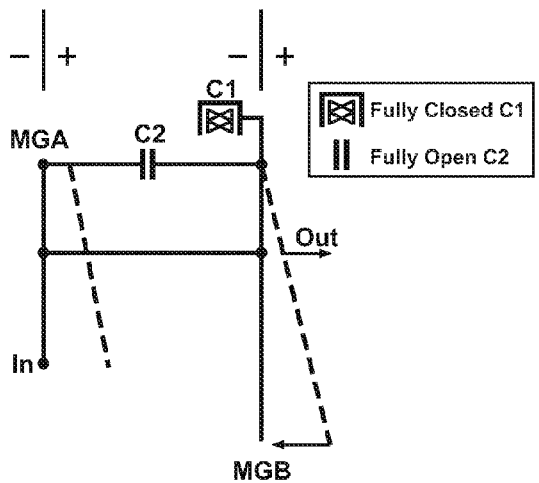

FIG. 3A shows the hybrid transmission 10 initially operating in the first continuously variable mode. Clutch C2 62' is in the fully-open state and clutch C1 60' is in the fully-closed state. The second torque machine 72 can be used to generate reactive torque for regenerative braking. The input torque from the input member 12 and the motor torques from the first and second torque machines 56 and 72 can be determined using the first kinematic relationship described with reference to Eqs. 1 and 3 in response to the torque output to the output member 64.

Figure 3B:
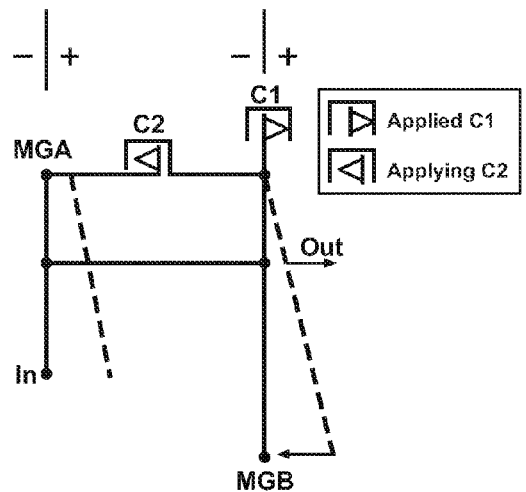

FIG. 3B shows a first step in the transition to the target continuously variable mode, i.e., the second continuously variable mode in this example. Clutch C1 60' transitions to the first one-way state to transfer torque in the first direction and clutch C2 62' transitions to the second one-way state to allow torque transfer in the second, opposite direction. At this step, the speed of the first torque machine is controlled at a nominally positive speed, therefore clutch C2 62' transfers no torque. The second torque machine 72 can be used to generate reactive torque for regenerative braking. The input torque from the input member 12 and the motor torques from the first and second torque machines 56 and 72 are determined using the first kinematic relationship described with reference to Eqs. 1 and 3 in response to the operator torque request to generate the torque output to the output member 64.

Figure 3C:
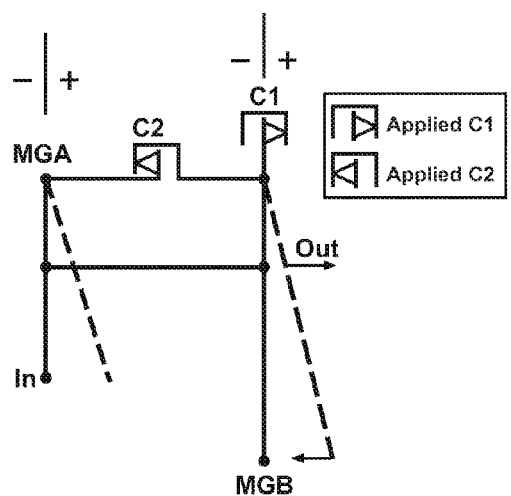

FIG. 3C shows a second step in the transition to the target continuously variable mode. Clutch C1 60' transitions from transferring full torque to transferring no torque and clutch C2 62' fully transitions to transferring full torque as the speed of the first torque machine 56 reaches zero, i.e., the synchronous speed. The second torque machine 72 can be used to generate reactive torque for regenerative braking. The input torque from the input member 12 and the motor torques from the first and second torque machines 56 and 72 are determined using the first kinematic relationship described with reference to Eqs. 1 and 3 in response to the operator torque request to generate the torque output to the output member 64.

Figure 3D:
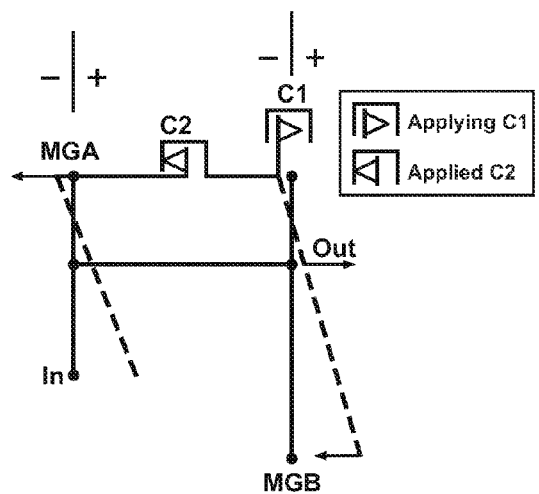

FIG. 3D shows a third step in the transition to the target continuously variable mode. Clutch C1 60' transitions to transfer no torque and clutch C2 62' fully transitions to transfer full torque as the speed of the first torque machine 56 decreases to a nominally negative rotation speed, i.e., less than zero. The torque output from the first torque machine 56 increases in a nominally negative direction. The input torque from the input member 12 and the motor torques from the first and second torque machines 56 and 72 are now determined using the second kinematic relationship described with reference to Eqs. 2 and 4 in response to the operator torque request to generate the torque output to the output member 64. The second torque machine 72 can be used to generate reactive torque for regenerative braking.

Figure 3E:
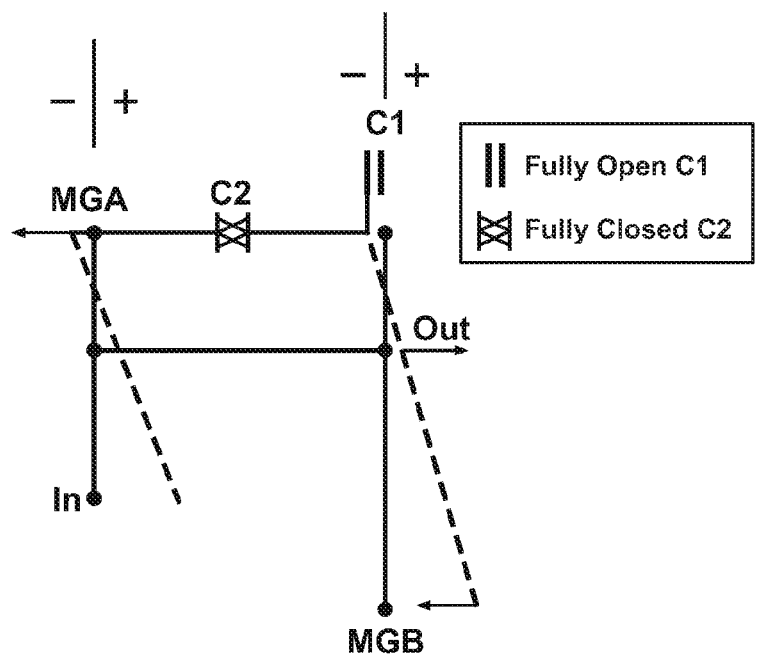

FIG. 3E shows a fourth step in the transition to the target continuously variable mode. Clutch C1 60' is in the first one-way state and transitions to the fully-open state. Clutch C2 62' transitions to the fully-closed state. The input torque from the input member 12 and the motor torques from the first and second torque machines 56 and 72 are determined using the second kinematic relationship described with reference to Eqs. 2 and 4 in response to the operator torque request to generate the torque output to the output member 64. The second torque machine 72 can be used for generating tractive torque and for generating reactive torque for regenerative braking. The speed of the first torque machine 56 is preferably nominally negative and low, around −50 rpm in one embodiment.

Figure 3F:
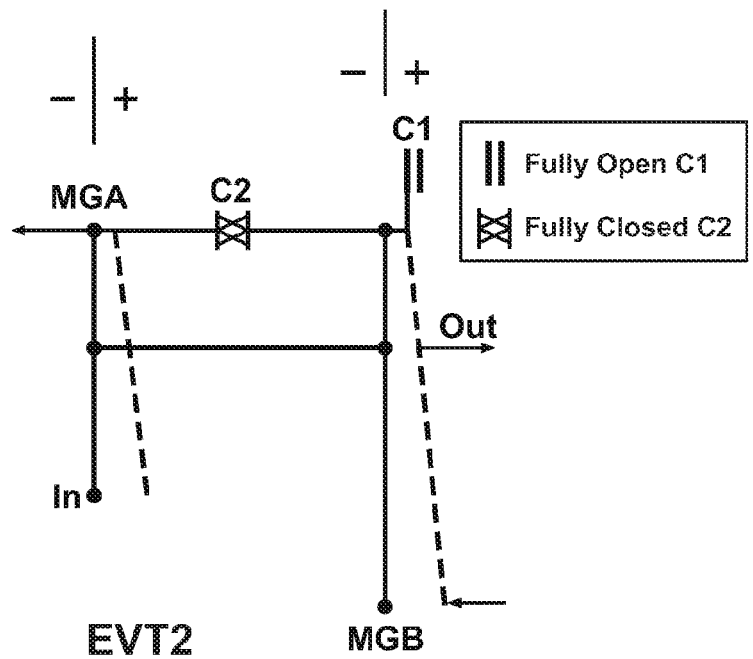

FIG. 3F shows operation in the target continuously variable mode. Clutch C1 60' is in the fully-open state. Clutch C2 62' is in the fully-closed state. The input torque from the input member 12 and the motor torques from the first and second torque machines 56 and 72 are determined using the second kinematic relationship described with reference to Eqs. 2 and 4 in response to the operator torque request to generate the torque output to the output member 64. The first and second torque machines 56 and 72 can be used for generating tractive torque and for generating reactive torque for regenerative braking. The speed of the first torque machine 56 transitions to being nominally positive.

The exemplary engine includes a multi-cylinder internal combustion engine selectively operative in several states to transfer torque to the hybrid transmission 10 via the input member 12, and can be either a spark-ignition or a compression-ignition engine. The engine includes a crankshaft operatively coupled to the input member 12 of the hybrid transmission 10. A rotational speed sensor monitors rotational speed of the input member 12. Power output from the engine, including rotational speed and engine torque, can differ from the input speed $N_I$ and the input torque $T_I$ to the hybrid transmission 10 due to placement of torque-consuming components on the input member 12 and/or placement of a torque management device between the engine and the hybrid transmission 10.

The hybrid transmission 10 can operate in a fixed gear operating range state by simultaneously applying the first and second clutch devices 60' and 62' in the fully-closed state, when the first and second clutch devices 60' and 62' include either Type I SOWC or Type II SOWC devices. The fixed gear operating range state can be commanded, e.g., during the second step in the transition to the target continuously variable mode, as shown with reference to FIG. 3C. In this operation clutch C1 60' continues to be the first one-way state to the open state and clutch C2 62' transitions to be applied in the second one-way state as the speed of the first torque machine 56 reaches zero, i.e., the synchronous speed. Both clutch C1 60' and clutch C2 62' are subsequently applied in the fully-closed state, and such operation can continue while variations in the operator torque request are minimal and the vehicle is in a stable driving condition with small disturbances in output speed.

Figure 4:
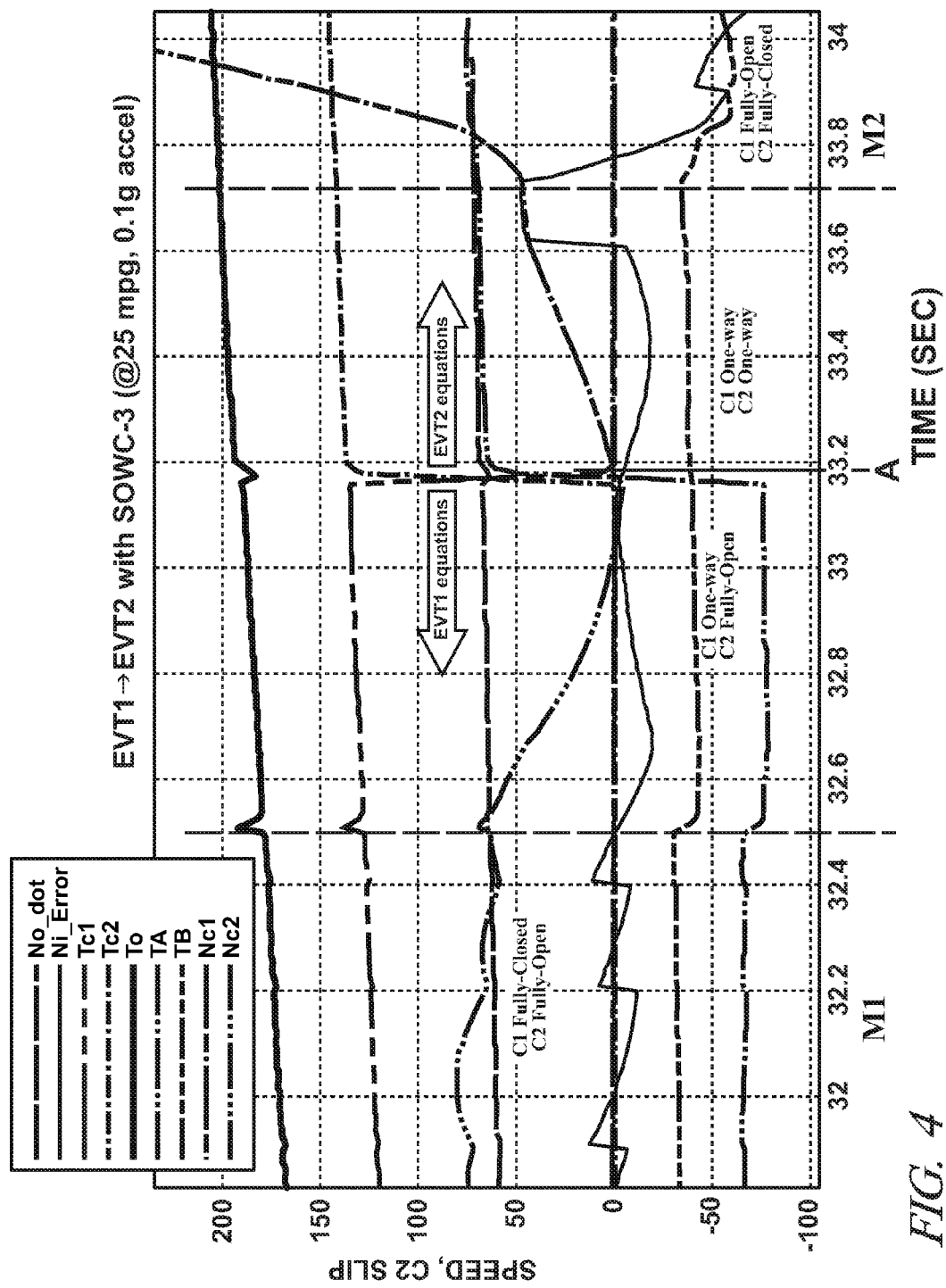
FIG. 4 is a datagraph, in accordance with the present disclosure.

FIG. 4 graphically depicts operation of the exemplary hybrid transmission 10 having the Type I SOWC clutch systems for both clutch C1 60 and clutch C2 62 during a transition from the first continuously variable mode (M1) to the second continuously variable mode (M2) over a period of time, operating in accordance to the shift operation described in FIG. 2. The depicted data includes a time-rate change in the rotational speed of the output member 64 (No_dot), an input speed error (Ni_Error), torque transferred across clutch C1 60 (Tc1) and across clutch C2 62 (Tc2), output torque at the output member 64 (To), motor torques output from the first and second torque machines 56 and 72 (TA and TB, respectively), and clutch slip speeds for clutch C1 60 (Nc1) and clutch C2 62 (Nc2). Initially clutch C1 60 is applied and fully-closed and clutch C2 62 is fully-open, and motor torques output from the first and second torque machines 56 and 72 are determined using the first kinematic relationship described with reference to Eqs. 1 and 3 (EVT1 equations).

Output torque to the driveline (To) and vehicle acceleration (Veh Accel) are increasing, and all the reactive torque is transferred across clutch C1 60 (To-C1). When there is a command to transition to operating in the second continuously variable mode, clutch C1 60 is applied in the selectable one-way state. Clutch C2 62 remains open. Torque output to the driveline is maintained by controlling input torque to the input member 12, e.g., from the engine 10, and the motor torques output from the first and second torque machines 56 and 72 are controlled using the first kinematic relationship described with reference to Eqs. 1 and 3 (EVT1 equations) before speed synchronization.

Slip speed of clutch C2 62 is monitored and controlled to synchronize members of clutch C2 62. When the slip speed of clutch C2 62 is approaching the predetermined normally negative speed below the synchronous speed, clutch C2 62 is applied in the one-way state to operate in the selectable one-way state. The speed of the first torque machine 56 is then controlled approaching the synchronous speed. When the slip speed of clutch C2 62 is less than the maximum allowable or permissible clutch slip speed, e.g., a clutch slip speed of less that 10 RPM in one embodiment, the control system transitions to using the second kinematic relationship described with reference to Eqs. 2 and 4 (EVT2 equations) to calculate the input torque to the input member 12 and motor torques output from the first and second torque machines 56 and 72 in response to the operator torque request.

The maximum allowable or permissible clutch slip speed for applying one of clutch C2 62 and clutch C1 60 is determined based upon a maximum permissible disturbance in the output torque to the driveline, and is based upon allowable driveline disturbances and effects upon transmission system and clutch durability. In one embodiment, the maximum permissible disturbance is 10 Nm, and thus the maximum allowable or permissible clutch slip speed for applying either of clutch C2 62 and clutch C1 60 is a clutch slip speed that induces a disturbance that is less 10 Nm. Preferably, a time-rate change in the input speed (Ni) is less than a maximum rate, e.g., 5 RPM/sec, when one of clutch C2 62 and clutch C1 60 is applied.

Subsequent to applying clutch C2 62, clutch C1 60 continues to be applied and operating in the selectable one-way state for a period of time while the system operation stabilizes. Subsequent to applying clutch C2 62, motor torque output from the first and second torque machines 56 and 72 is controlled using the second kinematic relationship described with reference to Eqs. 2 and 4 (EVT2 equations). Clutch C1 60 is subsequently commanded to the fully-open state and clutch C2 62 is commanded to the fully-closed state.

Figure 5:
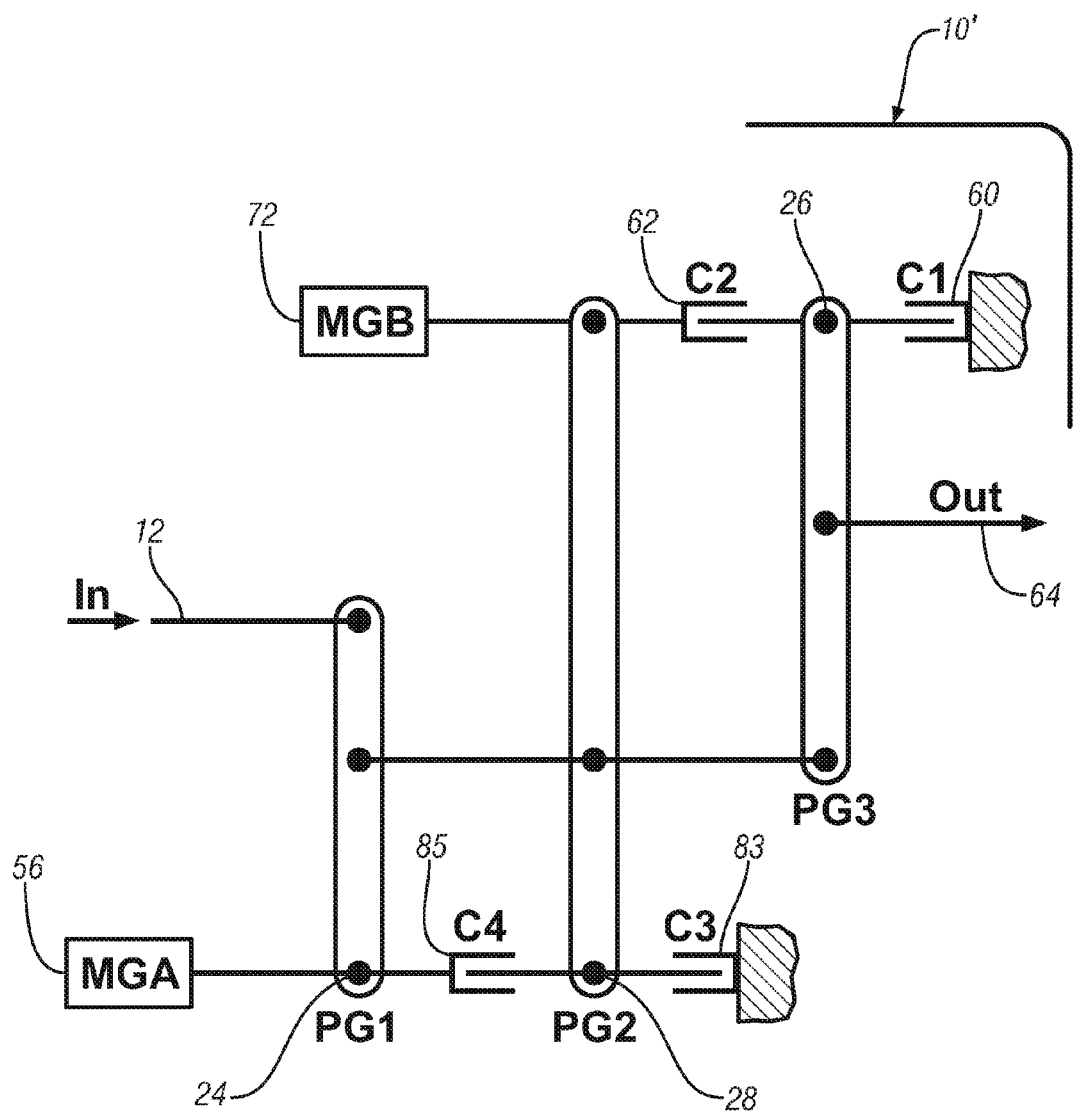
FIG. 5 is a schematic diagram of another embodiment of the exemplary transmission, in accordance with the present disclosure.

FIG. 5 shows another embodiment of a multi-mode hybrid transmission 10' in accordance with the system described herein. The exemplary four-mode hybrid transmission 10' includes first, second, and third differential gears 24, 28, and 26 (PG1, PG2, and PG3) each including planetary gears in one embodiment. There are first and second torque machines 56 and 72, first, second, third and fourth clutch devices C1 60, C2 62, C3 83, and C4 85, and an input member 12 and an output member 64. In one embodiment the input member 12 is coupled to an output shaft from an internal combustion engine, and the output member 64 is coupled to a driveline. The first, second, third and fourth clutch devices C1 60, C2 62, C3 83, and C4 85 are preferably synchronously applied and deactivated. In this embodiment, the first and second clutch devices C1 60 and C2 62 preferably include multiplate wet friction clutch devices. The third and fourth clutch devices C3 83 and C4 85 preferably include Type I selectable one-way clutch devices. The four-mode hybrid transmission 10' is operative in one of at least four continuously variable modes (EVT 1, EVT 2, EVT 3, and EVT 4) and three fixed gear states (FG 1, FG 2, and FG 3) by selectively applying the first, second, third and fourth clutch devices C1 60, C2 62, C3 83, and C4 85 to transfer mechanical power between the input member 12, the first and second torque machines 56 and 72 and the output member 64, as described with reference to Table 1.

TABLE 1

| Transmission State | C1 | C2 | C3 | C4 |
|---|---|---|---|---|
| Neutral | Off | Off | Off | Off |
| EVT 1 input-split | On | Off | On | Off |
| FG 1 | On | Off | On | On |
| EVT 2 compound-split | On | Off | Off | On |
| FG 2 | On | On | Off | On |
| EVT 3 Compound-split | Off | On | Off | On |
| FG 3 | Off | On | On | On |
| EVT 4 input-split | Off | On | On | Off |

In one example, when the four-mode hybrid transmission 10' transitions from the EVT 1 state to the EVT 2 state, the following occurs. Initially in the EVT1 mode, clutch C3 83 is fully closed and clutch C4 85 is fully open, with clutch C1 60 engaged and clutch C2 62 open. At a first step, the speed of the first torque machine 56 is controlled to a nominally negative speed and clutch C3 83 unlocks and changes to a one-way state, and is fully loaded to transfer torque thereacross. Clutch C4 85 changes to a one-way state, with no torque load thereacross. At a second step, the speed of the first torque machine 56 is controlled to a synchronous speed, at which point clutch C4 85 in the one-way state begins to apply and transfer torque and clutch C3 83 starts to unload torque. At a third step, clutch C4 85 is operating in the one-way state and is fully loaded and clutch C3 83 is in the one-way state with no torque load. At a fourth step, clutch C4 85 changes to a fully closed state, and clutch C3 83 changes to a fully open state. Thereafter, the four-mode hybrid transmission 4 operates in the EVT2 mode with clutch C4 85 fully closed, clutch C3 83 fully open, and with clutch C1 60 engaged and clutch C2 62 open. Operation in the EVT1 mode is determined using the first kinematic relationship described with reference to Eqs. 1 and 3 as applied to the embodiment of FIG. 5, and operation in the EVT2 mode is determined using the second kinematic relationship described with reference to Eqs. 2 and 4 as applied to the embodiment of FIG. 5.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for operating a multi-mode hybrid transmission configured to transfer power between an input member and an output member and first and second torque machines in one of two continuously variable modes by selectively applying two selectable one-way clutches, the method comprising:
    operating the hybrid transmission in an initial continuously variable mode including applying the first selectable one-way clutch and controlling an input torque at the input member and motor torques of the first and second torque machines using a first kinematic relationship to achieve a preferred output torque;

commanding the hybrid transmission to transition to operating in a target continuously variable mode including applying the second selectable one-way clutch and controlling the input torque at the input member and motor torques of the first and second torque machines using a second kinematic relationship to achieve the preferred output torque; and executing a multi-step process including transitioning the first selectable one-way clutch to a deactivated state, transitioning the second selectable one-way clutch to the applied state, and transitioning controlling the input torque at the input member and the motor torques of the first and second torque machines using the first kinematic relationship to using the second kinematic relationship to achieve the preferred output torque when rotational speeds of the first and second torque machines are substantially a synchronous speed, wherein executing the multi-step process comprises:

applying the first selectable one-way clutch in a one-way state;

controlling rotational speed of the first torque machine in a first direction;

applying the second selectable one-way clutch in a one-way state when the rotational speed of the first torque machine approaches a predetermined nominally negative speed less than the synchronous speed;

controlling rotational direction of the first torque machine in the first direction and adjusting rotational speed of the first torque machine toward the synchronous speed;

controlling rotational direction of the first torque machine in a second direction opposite the first direction; and operating the hybrid transmission in the target continuously variable mode to generate and transfer torque to the output member.

2. The method of claim 1, further comprising applying the second selectable one-way clutch in a fully-closed state and operating the hybrid transmission in the target continuously variable mode to generate and transfer torque to the output member.

3. The method of claim 2, further comprising applying the second selectable one-way clutch and using the second kinematic relationship to determine torque transfer between the first and second torque machines, the input member and the output member to effect operating the hybrid transmission in the target continuously variable mode.

4. The method of claim 3, further comprising using the second kinematic relationship to determine preferred motor torques output from the first and second torque machines corresponding to the input torque at the input member, the preferred output torque and changes in rotational speeds of the input member and the output member.

5. The method of claim 2, further comprising disabling regenerative braking operation subsequent to commanding the hybrid transmission to operate in the target continuously variable mode.

6. The method of claim 5, further comprising enabling the regenerative braking operation only subsequent to operating the hybrid transmission in the target continuously variable mode to generate and transfer torque to the output member.

7. The method of claim 1, further comprising the first and second selectable one-way clutches each operative in one of a fully-open state, first and second one-way states, and a fully-closed state.

8. The method of claim 7, further comprising applying the first selectable one-way clutch in the first one-way state and applying the second selectable one-way clutch in the second one-way state subsequent to commanding the hybrid transmission to operate in the target continuously variable mode.

9. The method of claim 8, further comprising enabling a regenerative braking operation subsequent to commanding the hybrid transmission to operate in the target continuously variable mode.

10. The method of claim 1, wherein the first and second selectable one-way clutches are each operative in first and second one-way states, and further comprising effecting operation in a fixed gear operating state by operating the first selectable one-way clutch in the fully-closed state and operating the second selectable one-way clutch in the fully-closed state.

11. The method of claim 2, wherein applying the second selectable one-way clutch in the fully-closed state comprises applying the second selectable one-way clutch in the fully-closed state.

12. Method for operating a hybrid transmission including first and second torque machines, first and second selectable one-way clutches, an input member and an output member, the hybrid transmission operative in a first continuously variable mode by applying the first selectable one-way clutch and operative in a second continuously variable mode by applying the second selectable one-way clutch, the method comprising:

controlling input torque and motor torques of the first and second torque machines using a first kinematic relationship to achieve a preferred output torque in the first continuously variable mode wherein the first selectable one-way clutch is applied in a fully closed state;

commanding a transition from operating in the first continuously variable mode to operating in the second continuously variable mode, comprising:

transitioning the first selectable one-way clutch to a first one-way state to transfer torque in a first direction, controlling rotational direction of the first torque machine in a first direction and adjusting rotational speed of the first torque machine toward a predetermined nominally negative rotational speed, applying the second selectable one-way clutch in a second one-way state to transfer torque in a second direction opposite the first direction, and controlling rotational direction of the first torque machine in the first direction and adjusting rotational speed of the first torque machine toward a synchronous speed, and controlling input torque and motor torques of the first and second torque machines using a second kinematic relationship to achieve a preferred output torque when the rotational speed of the first torque machine is substantially equal to zero revolutions per minute; and then operating the hybrid transmission in the second continuously variable mode.

13. The method of claim 12, further comprising deactivating the first selectable one-way clutch to a fully-open state subsequent to applying the second selectable one-way clutch in the one-way state.

14. The method of claim 12, wherein operating the hybrid transmission in the second continuously variable mode further comprises operating the hybrid transmission with the second selectable one-way clutch applied in the fully-closed state.

15. The method of claim 14, wherein operating the hybrid transmission with the second selectable one-way clutch applied in the fully-closed state comprises operating the second selectable one-way clutch with the clutch elements fixedly connected to transfer torque across the clutch elements when rotating in either of the first direction and the second, opposite direction.

16. Method for operating a multi-mode hybrid transmission configured to transfer power between an input member and an output member and first and second torque machines in one of two continuously variable modes by selectively applying torque transfer clutches including a first clutch and a selectable one-way clutch, the method comprising:
   operating the hybrid transmission in an initial continuously variable mode including applying the first clutch and including controlling an input torque at the input member and motor torques of the first and second torque machines using a first kinematic relationship to achieve a preferred output torque;
   commanding the hybrid transmission to transition to operating in a target continuously variable mode including applying the selectable one-way clutch and including controlling the input torque at the input member and motor torques of the first and second torque machines using a second kinematic relationship to achieve the preferred output torque; and
   executing a multi-step process to transition the first clutch to a deactivated state, transition the selectable one-way clutch to the applied state, and transition from controlling the input torque at the input member and the motor torques of the first and second torque machines using the first kinematic relationship to using the second kinematic relationship to achieve the preferred output torque when rotational speeds of clutch elements of the first clutch and the selectable one-way clutch are substantially synchronized, wherein executing the multi-step process comprises:
   deactivating the first clutch;
   controlling rotational speed of the first torque machine in a first direction;
   applying the selectable one-way clutch in a one-way state when the rotational speed of the first torque machine approaches a predetermined nominally negative speed less than the synchronized speed;
   controlling rotational direction of the first torque machine in the first direction and adjusting rotational speed of the first torque machine toward the synchronous speed;
   controlling rotational direction of the first torque machine in a second direction opposite the first direction; and
   operating the hybrid transmission in the target continuously variable mode to generate and transfer torque to the output member including applying the selectable one-way clutch in a fully-closed state.

17. The method of claim 16, further comprising deactivating the first clutch subsequent to applying the selectable one-way clutch in the one-way state.

* * * * *